United States Patent
Hugunin

(10) Patent No.: US 7,245,891 B2
(45) Date of Patent: Jul. 17, 2007

(54) WIRELESS MOBILE COMMUNICATION DEVICE HAVING A SPEAKER VIBRATION ALERT AND METHOD OF USING SAME

(75) Inventor: Derick Hugunin, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 776 days.

(21) Appl. No.: 10/689,884

(22) Filed: Oct. 21, 2003

(65) Prior Publication Data

US 2005/0085275 A1 Apr. 21, 2005

(51) Int. Cl.
*H03J 7/32* (2006.01)
*H04B 1/08* (2006.01)

(52) U.S. Cl. .................... 455/148; 455/149; 455/193.2

(58) Field of Classification Search ........ 455/148–149, 455/193.2; 340/384.1, 396.1, 404.1; 380/270–271
See application file for complete search history.

(56) References Cited

U.S. PATENT DOCUMENTS 6,686,833 B2 * 2/2004 Takahashi ................ 340/384.1
6,738,489 B2 * 5/2004 Chung et al. ................ 381/396

\* cited by examiner

*Primary Examiner*—Hosuk Song

(57) ABSTRACT

A mobile wireless communication device has a speaker that functions as a vibration alert in addition to an audio output device. The speaker is selected from a group of speakers having variation in mechanical vibration resonant frequency. A drive signal sweeps back and forth across a sweep frequency range including the varient speaker mechanical vibration resonant frequencies. The drive signal drives the speaker causing it to vibrate at the mechanical vibration resonant frequency and in turn causing the mobile wireless communication device to vibrate, thereby alerting the user. In this manner, the same drive signal can be used to vibrate each speaker at the speaker's mechanical vibration resonant frequency despite the variation in mechanical vibration resonant frequencies among the group of speakers.

26 Claims, 6 Drawing Sheets

WIRELESS MOBILE COMMUNICATION DEVICE HAVING A SPEAKER VIBRATION ALERT AND METHOD OF USING SAME

FIELD OF THE INVENTION

This invention relates to a mobile wireless communication device. More particularly, the present invention relates to a new and improved mobile wireless communication device incorporating a method for alerting a user with a speaker vibration alert.

BACKGROUND OF THE INVENTION

Wireless mobile communications devices, such as a mobile handset, are widely popular. Such wireless devices often have a speaker for producing audio sounds. For example, the speaker can reproduce a caller's voice, generate ringing tone sounds, play music or facilitate hands-free device operation.

Wireless mobile communications devices also may have a silent alert mechanism, such as a mechanical vibrator or flashing light. The silent alert quietly notifies the user of an event associated with the wireless mobile communication device. In this manner, the user is notified of the event while others situated nearby are not disturbed. For example, a mechanical vibrator silent alert creates a mechanical vibration that causes the wireless mobile communication device's enclosure to vibrate. A user in physical contact with the enclosure will sense the vibrations and thereby become notified of the event. Such a silent alert is useful when the user is in an environment in which an audio alert is prohibited. For example, a user may want a silent alert to notify the user of an incoming phone call while the user is inside a movie theater.

A wireless mobile communication device often has both a speaker and a mechanical vibrator alert. The speaker and the vibrator operate independently of each other and provide different functionality for the mobile wireless communication device. The speaker operates to generate audio signals for the user of the wireless mobile communication device, while the vibrator generates a mechanical vibration to alert the user of an event. Although the speaker may generated audio signals while the vibrator generates mechanical vibrations, the speaker and vibrator usually operate at different times such that only one of them is active at a given time.

In an effort to reduce costs and part count, the wireless mobile communication device may include a speaker that can generate a mechanical vibration for alerting the user. Such a speaker has both an acoustical resonant frequency and a mechanical vibration resonant frequency. The acoustical resonant frequency is within the speaker's audible or acoustical frequency range. The mechanical vibration resonant frequency is usually a low frequency below the speaker's audible frequency range. The speaker contains a moving mass that vibrates in response to a drive signal having the speaker's mechanical vibration resonant frequency. Such a speaker can be driven near the speaker's mechanical vibration resonant frequency to cause mechanical vibration in the speaker. The speaker is coupled to the wireless mobile communication device to facilitate the transfer of the vibrations from the speaker to the enclosure of the wireless mobile communication device. In this manner, the speaker operates as a mechanical vibrator silent alert.

The vibration force of the speaker is dependent upon the difference between the drive signal's frequency and the speaker's mechanical vibration resonant frequency. The vibration force in the speaker is greatest when the drive signal's frequency is equal to the speaker's mechanical vibration resonant frequency. The vibration force in the speaker decreases as the difference between the drive signal's frequency and the mechanical vibration resonant frequency increases. For all practical purposes, the speaker vibrates with sufficient vibration force to cause mechanical vibration in a narrow band of frequencies surrounding the mechanical vibration resonant frequency. This narrow band of frequencies is the excitation frequency range of the speaker. If a speaker is driven in the speaker's excitation frequency range, the speaker will mechanically vibrate to some degree. The speaker will vibrate with the largest amplitude at the center of the speaker's excitation frequency range, which is the speaker's mechanical vibration resonant frequency.

The speaker's mechanical vibration resonant frequency varies from speaker-to-speaker. A selected speaker from a group of speakers typically mechanically vibrates at a slightly different frequency than other speakers in the group. The frequency range encompassing all the speakers' mechanical vibration resonant frequencies in the group is the mechanical vibration resonant frequency range for the given group. This variation in mechanical vibration resonant frequencies makes it difficult to manufacture wireless mobile communication devices with the same drive signal source. If the drive signal source has only a single frequency, some of the speakers in the group will not vibrate sufficiently at that frequency. This presents significant difficulty in selecting a speaker for the wireless mobile communication device and therefore in manufacturing the wireless mobile communication device with the speaker.

One method that has been used to overcome this problem is driving the speaker with a composite signal having multiple frequencies. The composite signal is constructed by adding together multiple signals having different frequencies within the speakers' mechanical vibration resonant frequency range. Driving the selected speaker from the group of speakers with the composite signal increases the probability that one of the drive signal's constituent frequencies is within the excitation frequency range of the selected speaker. In this manner, the probability of mechanically vibrating each select speaker by driving the speaker with the composite signal increases significantly.

However, the composite signal typically has one or more beat frequencies. The beat frequencies are caused by the constructive and destructive interference of the composite signal's multiple constituent frequencies. The beat frequencies effectively drive the speaker at additional undesirable frequencies outside the speaker's excitation frequency range.

SUMMARY OF THE INVENTION

There exists a need to provide a silent alert using a speaker in which a drive signal more effectively drives speakers in a group having mechanical vibration resonant frequency variation.

Briefly, the present invention provides a drive signal to a speaker contained in a wireless mobile communication device. The speaker is selected from a group of speakers that resonate within a mechanical vibration resonant frequency range. The drive signal sweeps back-and-forth across the mechanical vibration resonant frequency range driving the speaker in an excitation frequency range near the speaker's mechanical vibration resonant frequency. In response, the speaker mechanically vibrates transferring energy to the coupled enclosure of the wireless mobile communication device. A user in contact with the enclosure is alerted by sensing the enclosure's vibration Advantages of the invention include increasing the effectiveness of the drive signal that drives the speaker. The drive signal effectively drives the speaker, selected from a group of speakers having a mechanical vibration resonant frequency range, at the selected speaker's mechanical vibration resonant frequency during each sweep of the drive signal. Additionally, the drive signal does not create beat frequencies that are present in a composite drive signal. Finally, the drive signal eliminates the need for a separate vibration device in the mobile wireless communication device thereby reducing the size, weight, part-count, manufacturing cost and power-consumption of the mobile wireless communication device.

DETAILED DESCRIPTION

Figure 1:
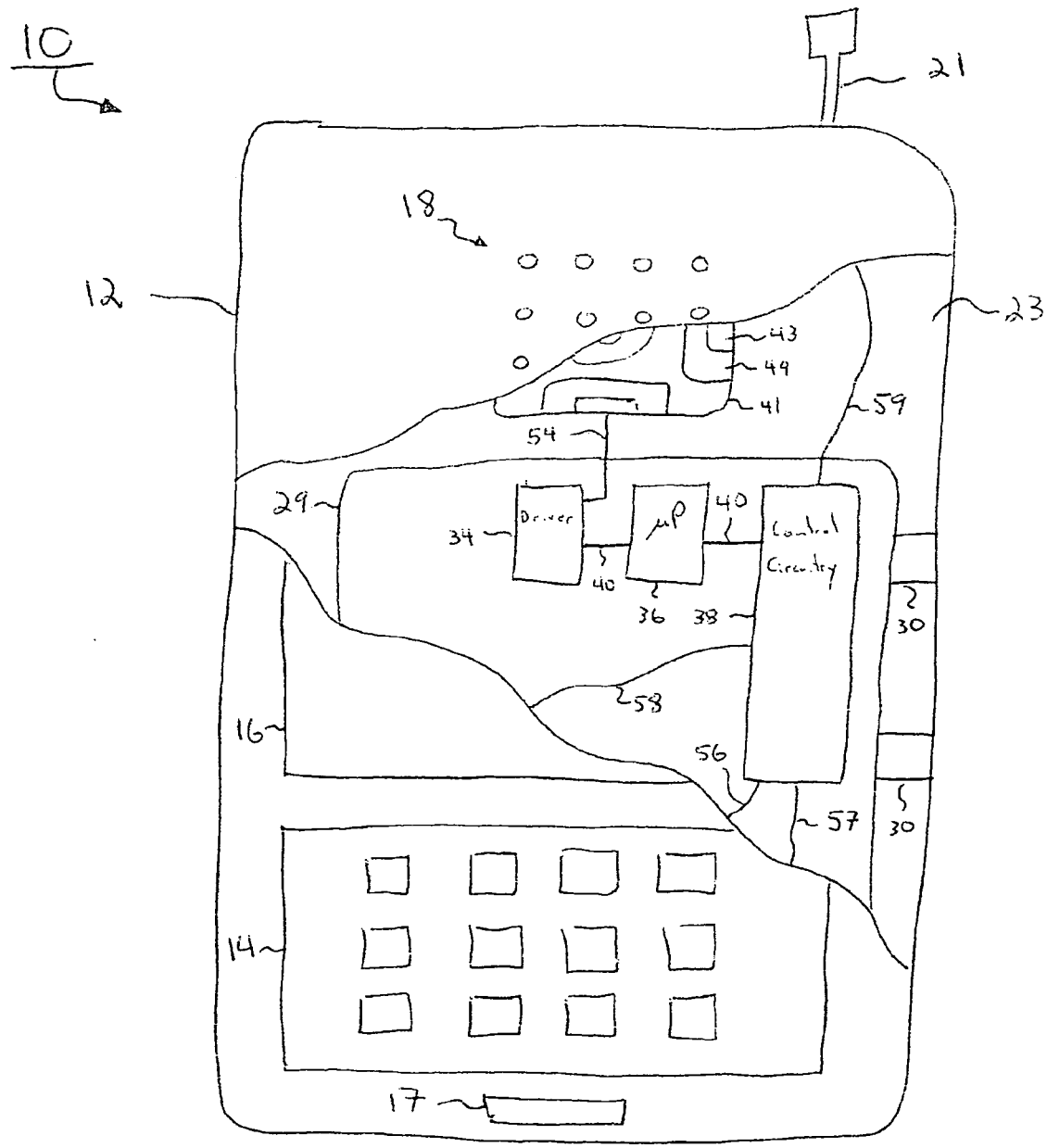
FIG. 1 is a cut-away front perspective view of a wireless mobile phone incorporating the present invention.

A wireless mobile communication device is shown in FIG. 1. More particularly, the wireless mobile communication device is shown in the form of a wireless handset 10. The wireless handset 10 has a housing 12. A keypad 14 and a display 16 are attached to the housing 12. The keypad 14 allows a user to input information and issue commands for the wireless handset 10. For example, the user may dial a phone number by using the keypad 14. The display 16 provides information to the user from the wireless handset 10. For example, the display 16 may show the phone number of an incoming call.

The wireless handset 10 includes a speaker 41 mounted to the housing 12. The speaker 41 is constructed to mechanically vibrate at a mechanical vibration resonant frequency when driven by a low frequency drive signal. The speaker 41 functions to generate audio signals and mechanical vibrations for the user. However, the mechanical vibration resonant frequency of the speaker 41 varies from speaker-to-speaker within a predetermined frequency range. A driver 34 generates a drive signal that sweeps back and forth across the predetermined frequency range. By sweeping back and forth across the predetermined frequency range, the driver 34 drives the speaker 41 at the speaker's mechanical vibration resonant frequency during each sweep. In this manner, the speaker 41 is driven in an efficient manner such that the speaker vibrates at the speaker's maximum vibration amplitude.

The wireless handset 10 will first be described with respect to input/output devices 14, 16, 17 and 21 mounted to the exterior of the housing 12. The wireless handset 10 will next be described with respect to the interior 23 of the housing 12. Finally, the method of selecting the speaker 41 during production of the wireless handset 10 will be described.

A microphone 17 is attached to the housing 12 for transforming the sounds of a user's voice into electrical signals. A speaker 41 in the interior 23 of the wireless mobile device 10 is mounted to the housing 12 at speaker holes 18. The speaker 41 transforms electrical signals into audio signals. For example, the speaker 12 reproduces the sound of a caller's voice from an electronic signal. The speaker 41 can also produce other audio signals such as generating a ringing tone in response to an incoming call or playing music. The speaker holes 18 facilitate the transfer of audio signals from the speaker 41 to the user.

The wireless handset 12 transmits and receives electrical signals to another wireless handset via antenna 21 attached to the housing 12. In this manner, the user of the wireless handset 10 can communicate with another user. The wireless handset 12 can also use the electrical signals to control the operation of the wireless handset 12.

The interior 23 of the mobile wireless communication device 10 includes a printed circuit board 29 attached to the housing 12 with mounting bracket 30. The printed circuit board 29 has a driver 34, a processor 36 and control circuitry 38. The processor is connected to the control circuitry 38 and to the driver 34 through lines 40. The processor 36 controls the overall operation of the mobile wireless communication device 10. The processor 36 receives control signals from the control circuitry 38 and sends output control signals to the control circuitry 38 and the driver 34. The control circuitry 38 interfaces to and controls operation of the keyboard 14 and microphone 17 through lines 56 and 57 respectively. The control circuitry also interfaces to the display 16 through lines 58 and to the antenna 21 through lines 59. The driver 34 is connected to the speaker 41 through lines 54. The driver 34 generates a drive signal for the speaker 41.

Figure 2:
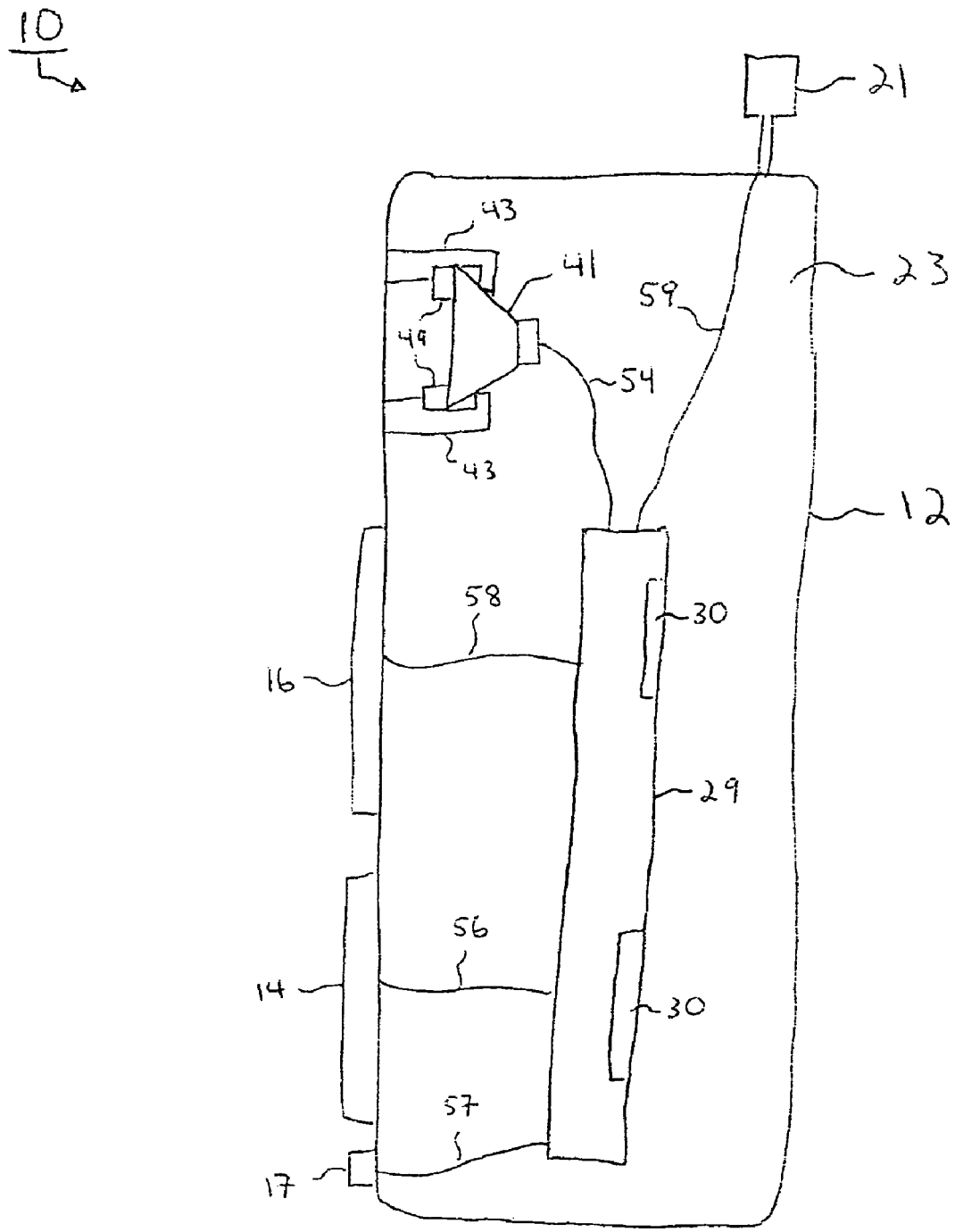
FIG. 2 is a cut-away side view of the wireless mobile phone shown in FIG. 1.

Referring to FIG. 2, the speaker 41 in the interior 23 of the mobile wireless communication device 10 is mounted to the housing 12 with optional mounting bracket 43 and gasket 49. The driver 34 drives the speaker 41 through lines 54 thereby causing the speaker 41 to generate audio signals and mechanical vibrations. The speaker 41 is mounted to the housing 12 at the speaker holes 18 (FIG. 1) to facilitate the transfer of audio signals generated by the speaker 12 in the interior 23 of the mobile wireless communication device 10 to the outside the housing 12. The mounting bracket 43 and gasket 49 also facilitate the transfer of vibrations from the speaker 41 to the housing 12. In this manner, mechanical vibrations of the speaker 41 are transferred to the housing 12 causing the housing 12 to vibrate. The user is alerted through sensing the vibrations of the housing 12.

During manufacturing of the wireless mobile communication device 10, a speaker 41 is selected from a group of speakers. The speakers 41 in the group have varying mechanical vibration resonant frequencies at which the speaker 41 has the greatest vibration amplitude in response to a drive signal having a constant driving force. The vibration amplitude response of each speaker 41 diminishes rapidly for the drive signal as the drive signal's frequency diverges from the speaker's mechanical vibration resonant frequency. The drivers 34 driving each selected speaker 41 are constructed to drive the same signal for each selected speaker 41.

Figure 3:
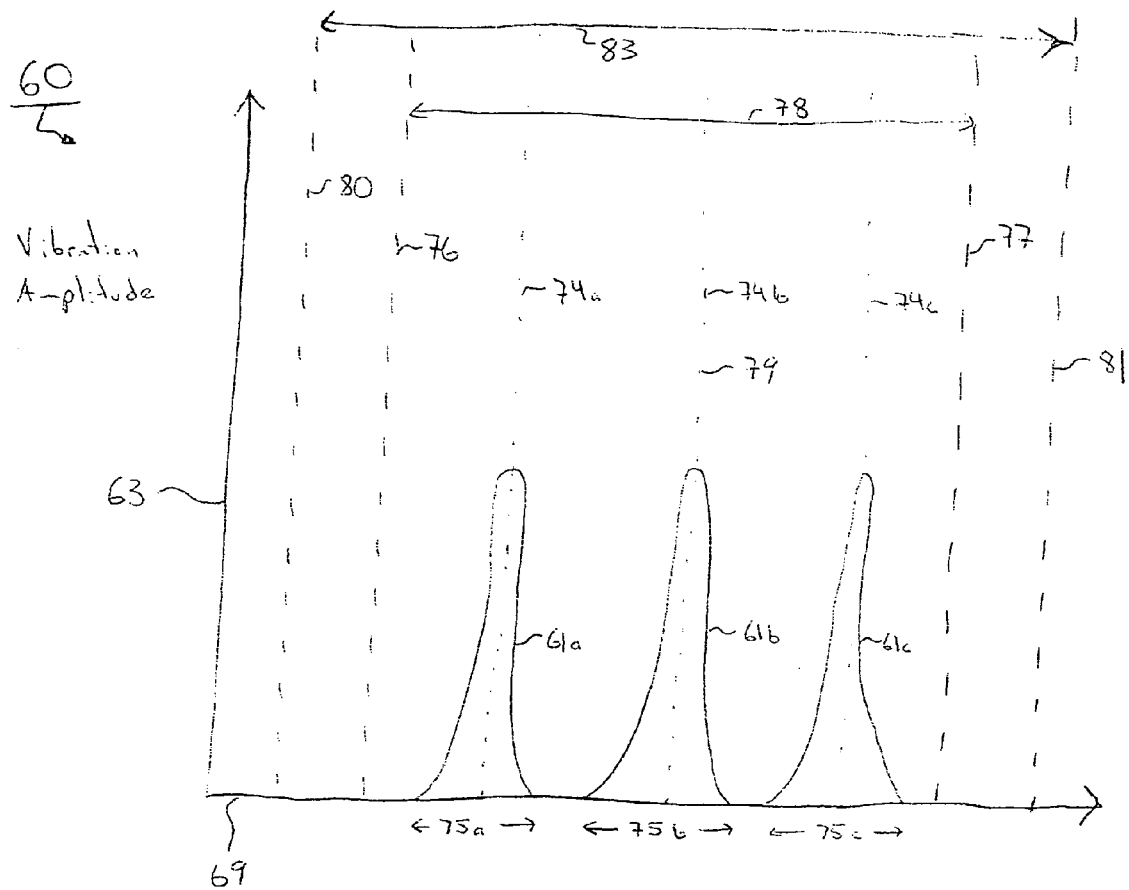
FIG. 3 is a graph illustrating vibration amplitude response characteristics of a speaker incorporated into the wireless mobile phone shown in FIGS. 1 and 2.
Figure 4:
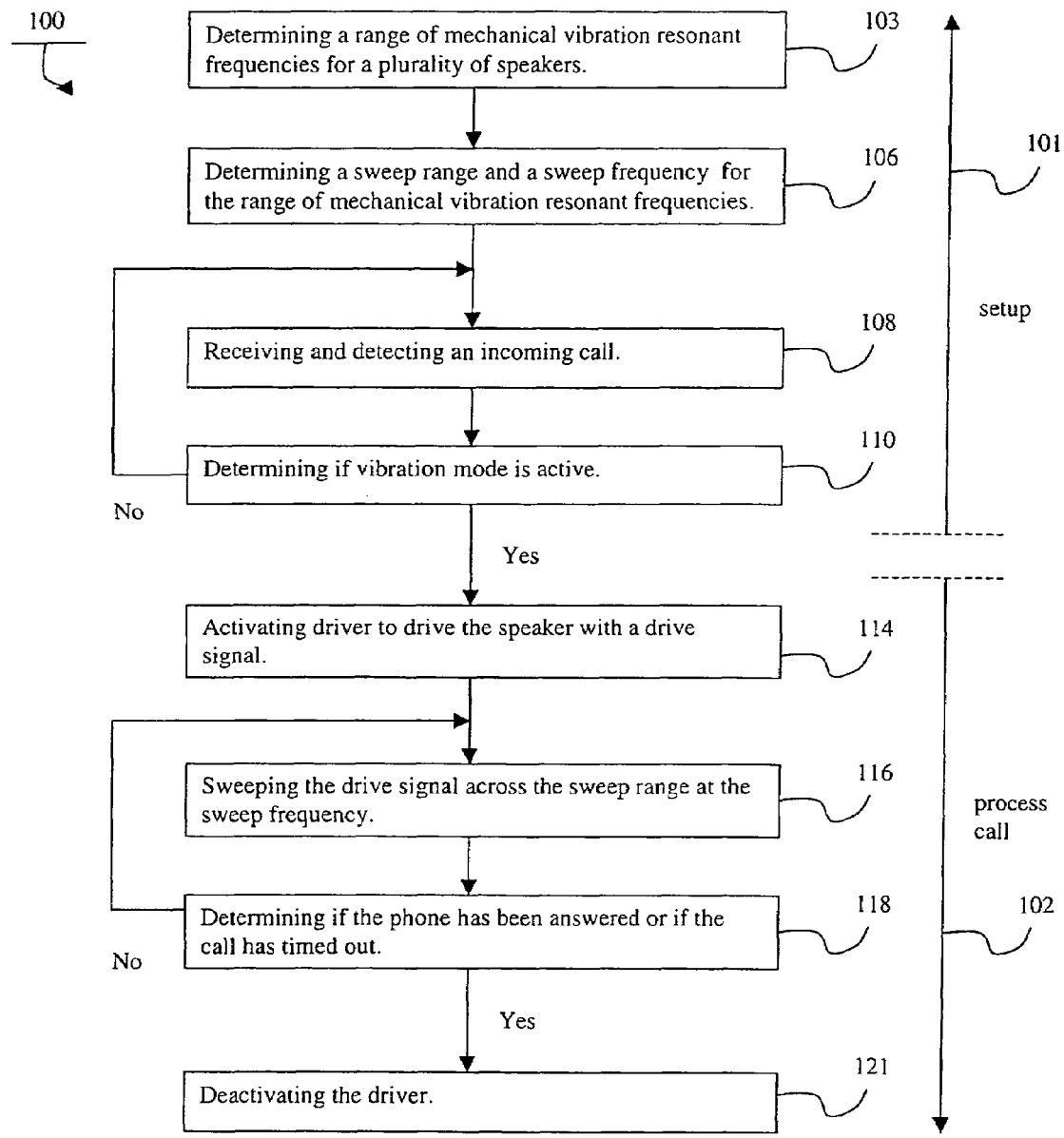
FIG. 4 is a flow chart illustrating a method incorporated into the present invention shown in FIGS. 1 and 2.

A graph 60 illustrating the vibration amplitude response characteristics of a typical speaker 41 is shown in FIG. 3. The graph 60 is a plot of the speaker's 41 (FIGS. 1 and 2)

vibration amplitude 63 along the vertical axis against the speaker's 41 driving frequency 69 along the horizontal axis for a constant driving force. The graph 60 shows typical frequency-amplitude response curves 61a, 61b or 61c for a typical speaker 41 (FIGS. 1 and 2). Each curve 61a, 61b and 61c represents the frequency response of a different speaker 41. That is, the response curves 61a, 61b and 61c represent the amplitude responses of different speakers each having a different respective mechanical vibration resonant frequency 74a, 74b or 74c. Each speaker 41 (FIGS. 1 and 2) selected from the group of speakers has a different mechanical vibration resonant frequency 74a, 74b or 74c at which the vibration amplitude 63a, 63b or 63c, respectively, is largest for the drive signal. The differences between response curves 61a, 61b and 61c, and between mechanical vibration resonant frequencies 74a, 74b and 74c are typically due to physical variation in the speakers 41. This results in the mobile wireless communication devices 10 (FIGS. 1 and 2) having different performance characteristics.

Each speaker 41 (FIGS. 1 and 2) also has a narrow excitation frequency range 75a, 75b or 75c at which the speaker 41 mechanically vibrates in response to a drive signal generated by the driver 34 (FIGS. 1 and 2). Typically, the excitation frequency range 75a, 75b and 75c varies from a low mechanical vibration resonant frequency 76 to a high mechanical vibration resonant frequency 77 across a mechanical vibration resonant frequency range 78. The mechanical vibration resonant frequency range 78 has a center frequency 79 that is approximately the midpoint of the mechanical vibration resonant frequency range 78. Typically, the low mechanical vibration resonant frequency 76 is about 130 Hz and the upper mechanical vibration resonant frequency 77 is about 150 Hz. The excitation frequency range is typically a narrow range of frequencies in the range of +/−5 Hz of the mechanical vibration resonant frequency 74.

The graph 60 also shows a lower sweep frequency 80 and an upper sweep frequency 81 spanning a sweep frequency range 83. The driver 34 (FIGS. 1 and 2) generates a drive signal in which the frequency sweeps back and forth along the sweep frequency range 83 at a selected sweep frequency. Preferably, the drive signal sweeps back and forth in continuous sinusoidal pattern. However, the drive signal may sweep back and forth in different continuous or discrete sweep pattern or transition between frequencies in a non-linear or random manner. Typically, the lower sweep frequency 80 is about 100 Hz and the upper sweep frequency 81 is about 200 Hz. However, the lower sweep frequency or the upper sweep frequency may fall within the mechanical vibration resonant frequency range 79. The sweep frequency is typically 50 Hz, but a lower or higher sweep frequency may be used. Preferably, the sweep frequency is sufficient to cause the speaker 41 (FIGS. 1 and 2) to vibrate in a continuous manner. By sweeping across the sweep frequency range, the drive signal drives the speaker at the speaker's mechanical vibration resonant frequency causing it to mechanically vibrate. Because the drive signal sweeps across the sweep frequency range, the drive signal will drive each speaker selected from the group of speakers at that speaker's mechanical vibration resonant frequency during each sweep. In this manner, the same drive signal can drive each selected speaker 41 at the speaker's mechanical vibration resonant frequency 74a, 74b or 74c thereby causing the speaker 41 to mechanically vibrate.

Figure 5:
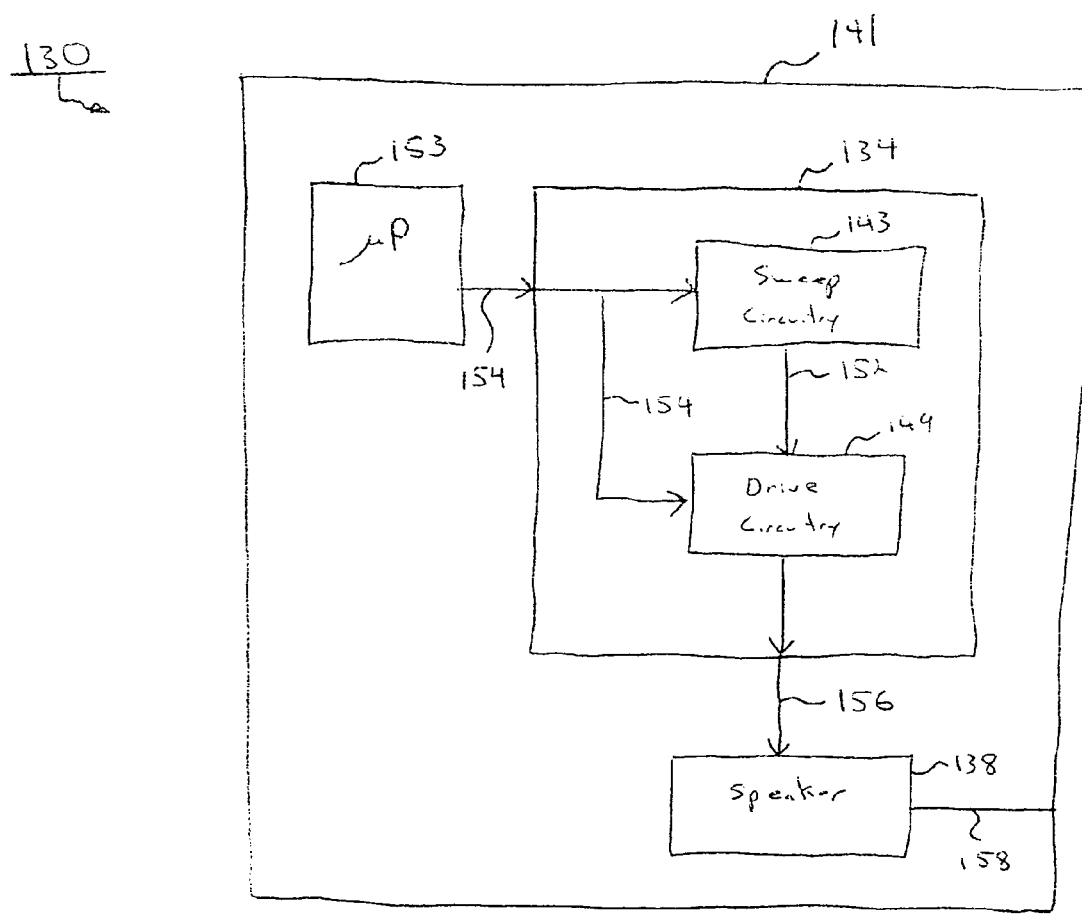
FIG. 5 is block diagram of the mobile wireless communication device shown in FIGS. 1 and 2.

A block diagram of the mobile wireless phone 130 is shown in FIG. 5. The block diagram illustrates the mobile wireless phone 130 in greater detail. The mobile wireless phone 130 has a driver 134 and a speaker 138 located inside housing 141. The driver 134 includes sweep circuitry 143 and drive circuitry 149 connected by lines 152. The sweep circuitry 143 controls the sweep frequency, sweep pattern and sweep frequency range 83 (FIG. 3) of the drive signal through lines 154 and under control of the processor 153. The drive circuitry 149 amplifies the drive signal to drive the speaker 138 through lines 156. The drive signal's frequency varies as the drive signal sweeps back and forth across the sweep frequency range 83 (FIG. 3) producing a mechanical vibration amplitude 63 (FIG. 3) in the speaker 138. The mechanical vibration of the speaker 138 is transferred to the housing 141 through the mounting bracket 158. By sweeping the drive signal across the sweep frequency range 83 (FIG. 3), the drive signal can drive each speaker 138, selected from a group of speakers having varying mechanical vibration resonant frequencies, causing the selected speaker to vibrate and thereby alerting the user.

Figure 6:
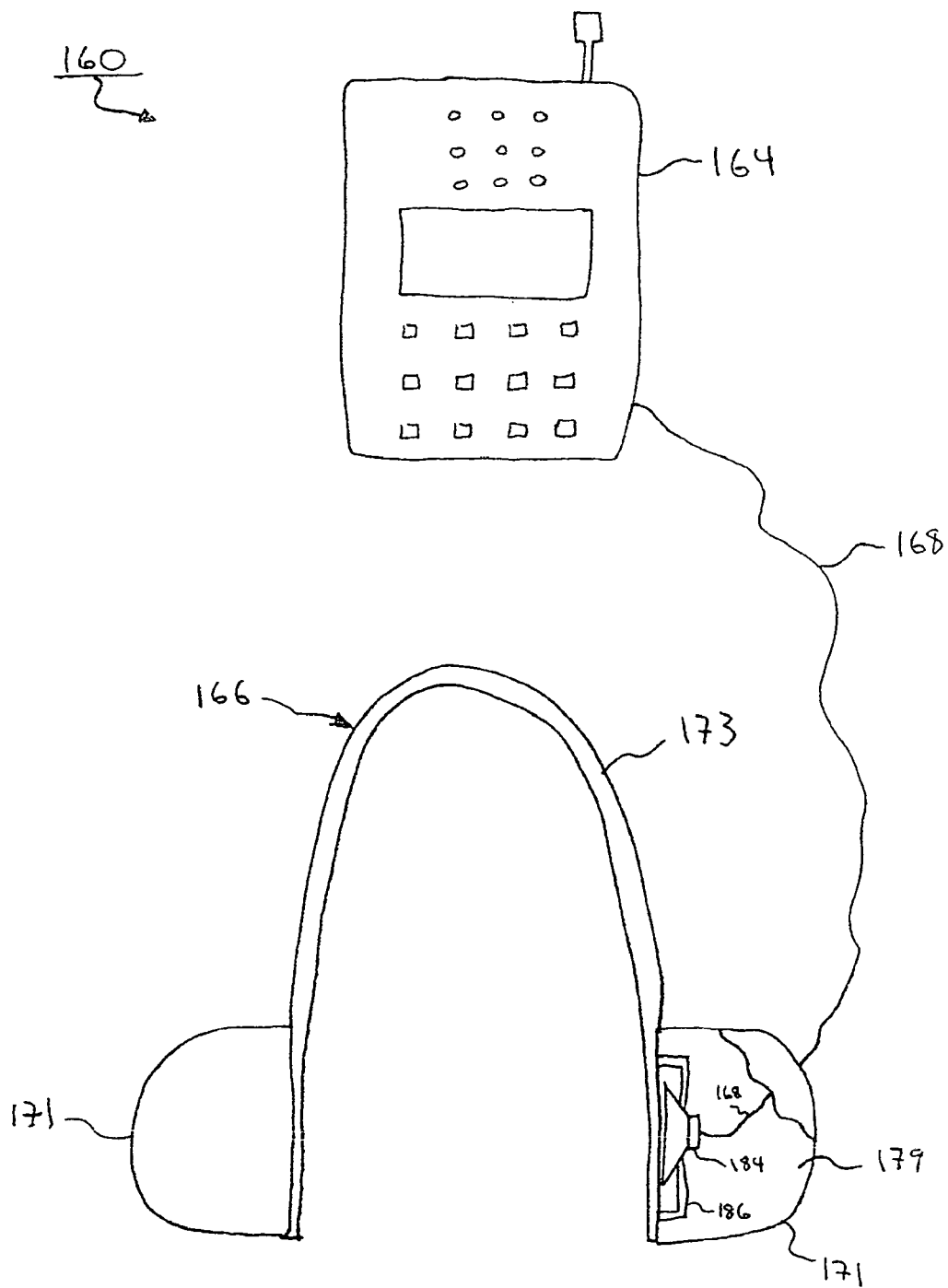
FIG. 6 is a perspective view of another embodiment incorporating the present invention.

Another wireless mobile communication device 160 is shown in FIG. 6. The mobile wireless communication device 160 includes a mobile wireless phone 164 and an accessory, such as a headset 166, coupled with link 168. The headset 164 includes earpieces 171 connected to a headband 173. The interior 179 of the earpiece 171 includes a speaker 184 mounted to the earpiece 171 with mounting bracket 186.

In response to a significant event, such as a call signal indicating an incoming phone call, the mobile wireless phone 164 produces a drive signal that is transferred to the headset 166 via the link 168. Preferably, link 168 is a wireless communication link, but the link 169 can be any link customarily used for communication between electronic devices. The drive signal drives the speaker 184 causing the speaker 184 to mechanically vibrate. The drive signal's frequency varies as the drive signal sweeps back and forth across the sweep frequency range 83 (FIG. 3) producing a mechanical vibration amplitude 63 (FIG. 3) in the speaker 184. The vibrations generated in the speaker 184 are then transferred to the earpiece 171 and the headband 166 through mounting bracket 186. In this manner, a user is alerted to the event by sensing the vibration of the speaker without the need for a separate vibrator device in the headband 173 or mobile wireless phone 164.

Wireless mobile communication devices incorporating the present invention have been shown and described with a degree of particularity. These descriptions are examples of the invention. In distinction to these examples, it should be understood that the scope of the present invention is defined by the scope of the following claims, which are not necessarily limited to the detailed description of the embodiments set forth above.

The invention claimed is:

1. A mobile wireless communication device having a vibration alert, the mobile wireless communication device comprising:
   a housing;
   a speaker attached to the housing, the speaker selected from a plurality of different speakers, wherein each speaker is constructed to vibrate at a different mechanical vibration resonant frequency;
   sweep circuitry configured to produce a sweeping signal for the plurality of different speakers;
   drive circuitry responsive to the sweeping signal, the drive circuitry coupled to the sweep circuitry and to the speaker and configured to drive each of the plurality of different speakers at a sweeping frequency that causes each of the speakers to vibrate; and
   control circuitry selectively activating the sweep circuitry.

2. The mobile wireless communication device of claim 1, wherein the mechanical vibration resonant frequency is in the frequency range of about 130 Hz to about 180 Hz.

3. The mobile wireless communication device of claim 1, wherein the drive signal is in the frequency range of about 100 Hz to about 250 Hz.

4. The mobile wireless communication device of claim 1, wherein the sweep circuitry drives the speaker by sweeping back and forth across the frequency range of the drive signal at a rate of about 50 Hz.

5. The mobile wireless communication device of claim 4, wherein the sweep circuitry sweeps back and forth across the range of the drive signal in a substantially sinusoidal pattern.

6. The mobile wireless communication device of claim 4, wherein the sweep circuitry sweeps back and forth across the range of the drive signal in a discrete pattern.

7. A vibrator for a wireless phone, comprising:
  a speaker selected from a plurality of different speakers, wherein each speaker is constructed to resonate at a different mechanical vibration resonant frequency.
  a driver coupled to the speaker and constructed to generate a drive signal in a predetermined frequency range for the plurality of different speakers, wherein the mechanical vibration resonant frequency for each speaker is within the predetermined frequency range and the drive signal sweeps back and forth across the predetermined frequency range at a sweep frequency; and
  control circuitry selectively activating the driver thereby causing each speaker to vibrate in the excitation frequency range for the plurality of different speakers.

8. The mobile wireless communication device of claim 7, wherein the speaker vibrates at the speaker's mechanical vibration resonant frequency.

9. The mobile wireless communication device of claim 8, wherein the mechanical vibration resonant frequency is in the frequency range of about 130 Hz to about 180 Hz.

10. The mobile wireless communication device of claim 7, wherein the drive signal is in the frequency range of about 100 Hz to about 250 Hz.

11. The mobile wireless communication device of claim 7, wherein the sweep circuitry drives the speaker by sweeping back and forth across the frequency range of the drive signal at a rate of about 50 Hz.

12. The mobile wireless communication device of claim 7, wherein the sweep circuitry sweeps back and forth across the range of the drive signal in a substantially sinusoidal pattern.

13. The mobile wireless communication device of claim 7, wherein the sweep circuitry sweeps back and forth across the range of the drive signal in a discrete pattern.

14. A method of generating a vibration alert on a mobile wireless communication device, comprising the steps of:
  determining a range of mechanical vibration resonant frequencies for a plurality of different speakers;
  determining a sweep range and a sweep frequency for the range of mechanical vibration resonant frequencies for the plurality of different speakers;
  receiving and detecting a call signal;
  determining if a vibration mode of the mobile wireless communication device is active;
  activating a driver to drive each speaker with a drive signal;
  sweeping the drive signal across the sweep range and at the sweep frequency thereby causing each speaker to vibrate in the speaker's excitation frequency range;
  determining if the phone has been answered or the call has timed out; and
  deactivating the driver.

15. The method of claim 14, wherein the step of sweeping the drive signal causes the speaker to vibrate at the speaker's mechanical vibration resonant frequency.

16. The method of claim 14, wherein the mechanical vibration resonant frequency range is from about 130 Hz to about 180 Hz.

17. The method of claim 14, wherein the sweep range is from about 100 Hz to about 250 Hz.

18. The method of claim 14, wherein the sweep frequency is about 50 Hz.

19. The method of claim 14, further including the step of:
  sweeping the drive signal across the sweep range in a substantially sinusoidal pattern.

20. The method of claim 14, further including the step of:
  sweeping the drive signal across the sweep range in a discrete pattern.

21. A method of receiving a vibration alert from a mobile wireless communicate device, wherein the mobile wireless communications device includes a speaker selected from a group of different speakers, wherein the plurality of different speakers have a predetermined range of mechanical vibration resonant frequencies, the mobile wireless communications device further including a driver having a predetermined sweep range and a predetermined sweep frequency, the method comprising the steps of:
  receiving and detecting a call signal;
  generating a drive signal in response to the call signal to drive each of the different speakers, wherein the drive signal sweeps across the predetermined range of vibration frequencies at the sweep frequency thereby causing each of the different speakers to vibrate; and
  alerting the user with the vibrations of the speaker.

22. The method of claim 21, wherein the mechanical vibration resonant frequencies are in the frequency range of about 130 Hz to about 180 Hz.

23. The method of claim 21, wherein the sweep range is about 100 Hz to about 250 Hz.

24. The method of claim 21, where the sweep frequency is about 50 Hz.

25. The method of claim 21, further including the step of:
  sweeping the drive signal across the sweep range in a substantially sinusoidal pattern.

26. The method of claim 21, further including the step of:
  sweeping the drive signal across the sweep range in a discrete pattern.

* * * * *